UNITED STATES PATENT OFFICE.

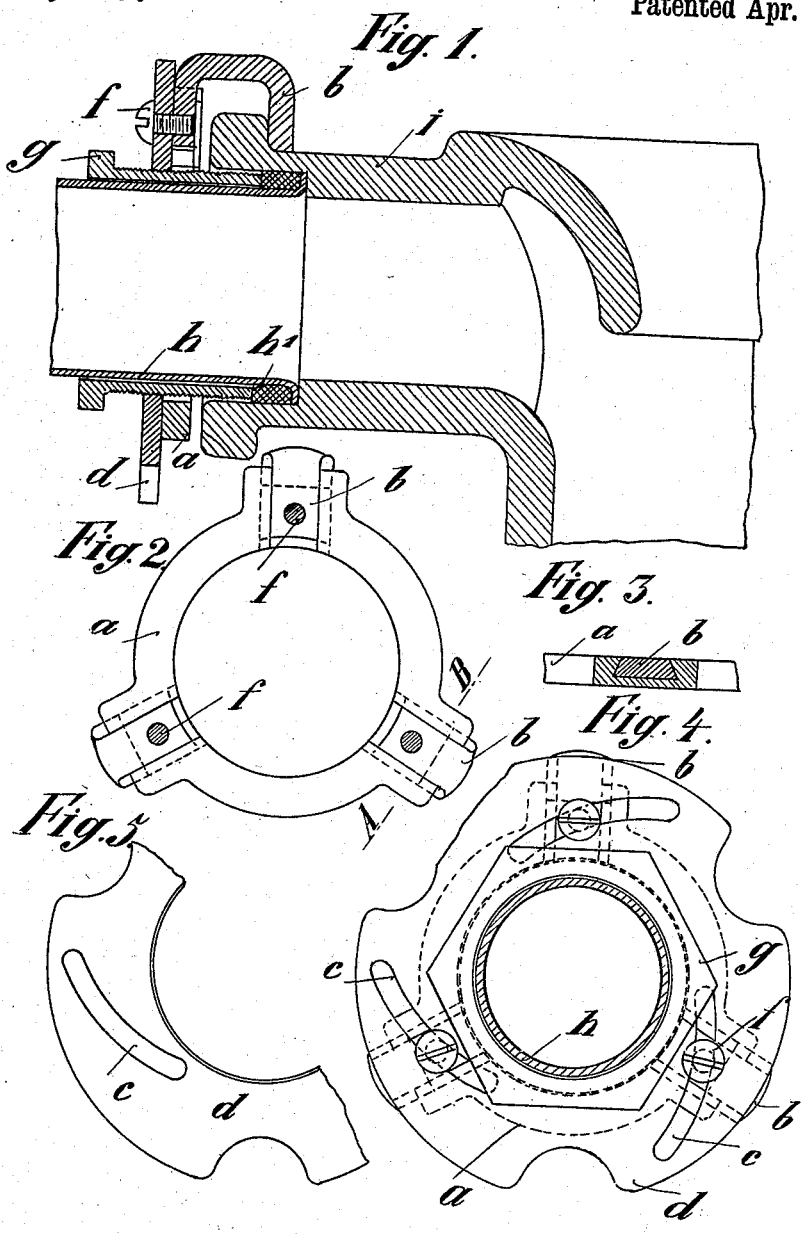

HEINRICH OIDTMANN, OF ELBERFELD, GERMANY.

COUPLING FOR THE FLUSHING-PIPES OF WATER-CLOSETS.

No. 919,935.　　　Specification of Letters Patent.　　　Patented April 27, 1909.

Application filed December 16, 1908. Serial No. 467,815.

*To all whom it may concern:*

Be it known that I, HEINRICH OIDTMANN, a subject of the German Emperor, and resident of Elberfeld, Germany, have invented certain new and useful Improvements in Couplings for the Flushing-Pipes of Water-Closets, of which the following is a specification.

The flanged sockets of the flushing-pipes of water-closets are very often of different diameter so that it is impossible to use a pipe joint of one and the same diameter indifferently with any water-closet. The coupling of the two parts, which at present is generally effected by means of screw-bolts further suffers from the inconvenience that, if the nuts be screwed up too much, the flanged socket is easily damaged.

The object of the present invention is, to avoid said inconveniences.

The invention, therefore, relates to an adjustable coupling which can be used with flushing-pipes and flanged sockets of any diameter.

The improved coupling is shown in the accompanying drawings in Figure 1 in longitudinal section and in connection with the flanged socket and flushing-pipe. Fig. 2 represents a constructional detail in ground-plan, which is shown in Fig. 3 in cross section on line A—B. Fig. 4 represents the coupling in front view and Fig. 5 shows a constructional detail.

The coupling-device consists of a disk $a$ which has dovetail grooves in which dovetail-cramps $b$ are guided so that they can be radially displaced. Said cramps $b$ are U-shaped and they are simultaneously displaced by means of an annular disk $d$ which has curved slots $c$, one for each cramp. The cramps $b$ are guided in said curved slots $c$ by means of screw-bolts $f$. The cramps $b$ are adjusted in their positions by the revolution of annular disk $d$ upon disk $a$. The gland $g$ of a stuffing-box is screwed into annular disk $d$.

The device is used as follows:—The coupling-device is placed upon the end of the flushing-pipe $h$, which usually is made of lead, the end of said pipe $h$ having previously been flanged, and the end of the flushing-pipe $h$ with the coupling-device is then inserted into the enlarged part of socket $i$.

The packing $h^1$ which is preferably made of hemp, is wound around the pipe and stuffed in. The cramps $b$ which are in the extreme outer position, grip over the flange of socket $i$ and are now displaced by the rotation of annular disk $d$ so that they are strongly pressed against the outer surface of said socket. The disk $d$ being revolved by hand, that is to say without any key, the socket cannot be damaged owing to said disk being screwed up too much. To facilitate the handling of annular disk $d$ the same can have incisions or the like. Instead of flanging the end of the flushing-pipe $h$ any other bearing-surface for the packing may be provided. Any other suitable material but hemp can be used for packing the pipe. The grooves and slots in the disks can be of any other suitable shape and the device in general can be made of any suitable material. The gland $g$ will be of a thickness corresponding to the diameter of the flushing-pipe. Instead of gland $g$ any other suitable means may be used for maintaining the packing, for example the following arrangement may be used: Concentric slots can be provided in annular disk $d$ between the curved slots, destined to receive screw-bolts which are screwed into disk $a$ and adapted to act upon a suitable packing-ring. There may further be provided any suitable number of cramps, which can be of any other shape as that shown.

I claim:

An improved coupling-device for flushing-pipes of water-closets comprising in combination an annular disk having radial dovetailed grooves, U-shaped cramps, an outer dovetailed end of said U-shaped cramps engaging with the corresponding guide-groove, a screw screwed into said dovetailed end of each cramp, a second annular disk having curved guide-slots for the screws of the cramps, packing material placed between the end of the flushing-pipe and the flanged socket and a gland screwed into the outer movable disk for maintaining said packing, substantially as described and for the purpose set forth.

In witness whereof I have hereunto set my hand in the presence of two witnesses.

HEINRICH OIDTMANN.

Witnesses:
　LOUIS VANDORN,
　BESSIE F. DUNLAP.